United States Patent
Dillon et al.

[15] 3,696,464
[45] Oct. 10, 1972

[54] FOWL FOOT REMOVER SYSTEM
[72] Inventors: Janus J. Dillon, Irving; Bryan T. Snowden, Grapevine, both of Tex.
[73] Assignee: Food Equipment, Inc., Dallas, Tex.
[22] Filed: Jan. 18, 1971
[21] Appl. No.: 106,982

[52] U.S. Cl. ................................................17/11
[51] Int. Cl. .............................................A22c 21/00
[58] Field of Search ...............................17/11, 52

[56] References Cited
UNITED STATES PATENTS

| | | | |
|---|---|---|---|
| 2,958,092 | 11/1960 | Curtis | 17/11 |
| 3,042,186 | 7/1962 | Varney | 17/11 X |
| 3,124,831 | 3/1964 | Aitenpohl | 17/11 |
| 3,199,143 | 8/1965 | Ousley et al. | 17/11 |
| 3,405,423 | 10/1968 | Vertegaal | 17/11 |
| 3,522,622 | 8/1970 | Crane | 17/11 |

Primary Examiner—Lucie H. Laudenslager
Attorney—Richards, Harris & Hubbard

[57] ABSTRACT

The specification discloses a system for removing fowl feet depending from shackles. The system includes a guide surface mounted in the path of the shackles for positioning the feet generally horizontally. A rotating blade is positioned rearwardly of the guide surface for shearing knuckle portions from the feet. Rotating flexible fingers then strike the remaining portions of the feet on the shackles to propel the feet from the shackles. A hopper is disposed below the rotating blade and the flexible fingers for receiving the severed knuckle portions and the feet.

11 Claims, 4 Drawing Figures

3,696,464

INVENTORS:
JANUS J. DILLON
BRYAN T. SNOWDEN

ATTORNEYS

INVENTORS:
JANUS J. DILLON
BRYAN T. SNOWDEN

Richards, Harris & Hubbard
ATTORNEYS

FOWL FOOT REMOVER SYSTEM

FIELD OF THE INVENTION

This invention relates to a processing of fowl, and more particularly to a method and apparatus for removing fowl feet depending from moving shackles.

THE PRIOR ART

In the processing of fowl such as poultry, the fowl are conventionally slaughtered and hung by their feet from a traveling shackle. The fowl are then moved through various processing stations such as a scalding station, a picking station wherein the feathers are removed, a singeing station, a washing station and thence to a hock cutter which separates the fowl carcass from the feet. The carcass is conveyed away for further processing, while the feet of the fowl remain hanging from the shackles.

Devices have thus been heretofore developed to remove the fowl feet remaining in such shackle systems to enable the shackles to be cycled back for use in further fowl processing. Automatic tripping shackles have thus been developed which may be tripped to an open position in order to release the feet of the fowl. However, such automatic tripping shackles are somewhat expensive, and often present maintenance problems. Systems have thus been developed for use with non-tripping fixed shackles to remove the feet of fowl depending therefrom, such systems including fixed parallel plates through which the shackles travel to cause the feet to ride upwards in the shackles and to fall by gravity therefrom. Additionally, systems have been previously developed wherein rotating members strike the feet depending from fixed non-tripping shackles in an effort to remove the feet therefrom. However, such feet removing systems for use with non-tripping fixed shackles have not been completely satisfactory, and feet have sometimes remained in the shackles, thereby presenting problems when the shackles are recycled for further use.

SUMMARY OF THE INVENTION

In accordance with the present invention, a system is provided for removing the feet of fowl from moving shackles. The present system is extremely efficient and dependable, and includes structure for removing the knuckle portion of the feet depending from the shackles, in combination with a device for striking the feet remaining on the shackles with sufficient force to propel the feet from the shackles.

In accordance with a more specific aspect of the invention, a system is provided for removing fowl feet depending from shackles which includes a guide surface mounted in the path of the shackles for positioning the feet in a generally horizontal position. A rotating blade shears the knuckle portions from the feet while the feet move in the generally horizontal position. A hopper is disposed below the blade to receive the severed knuckle portions. Rotating flexible fingers are mounted over the hopper for striking the feet to propel the feet from the shackles and into the hopper.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
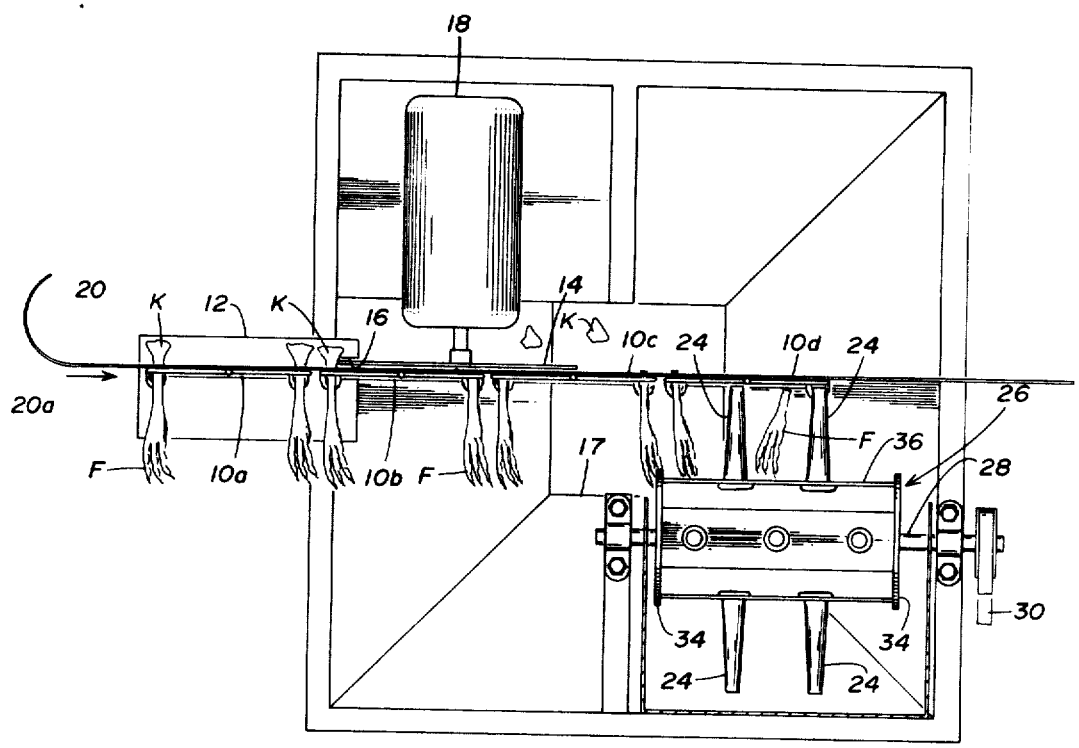
FIG. 1 is a top view of the present system, with certain upper portions of the device removed for clarity of illustration.

Referring to FIG. 1, a plurality of conventional fixed non-tripping shackles 10a–d are moved from left to right along a path of travel by a conventional shackle transporting system. In such a system, the shackles include rollers which are moved along an overhead I-beam by a moving chain. In the drawings, the overhead beam and conventional shackle transporting structure has been omitted for ease of illustration.

Figure 2:
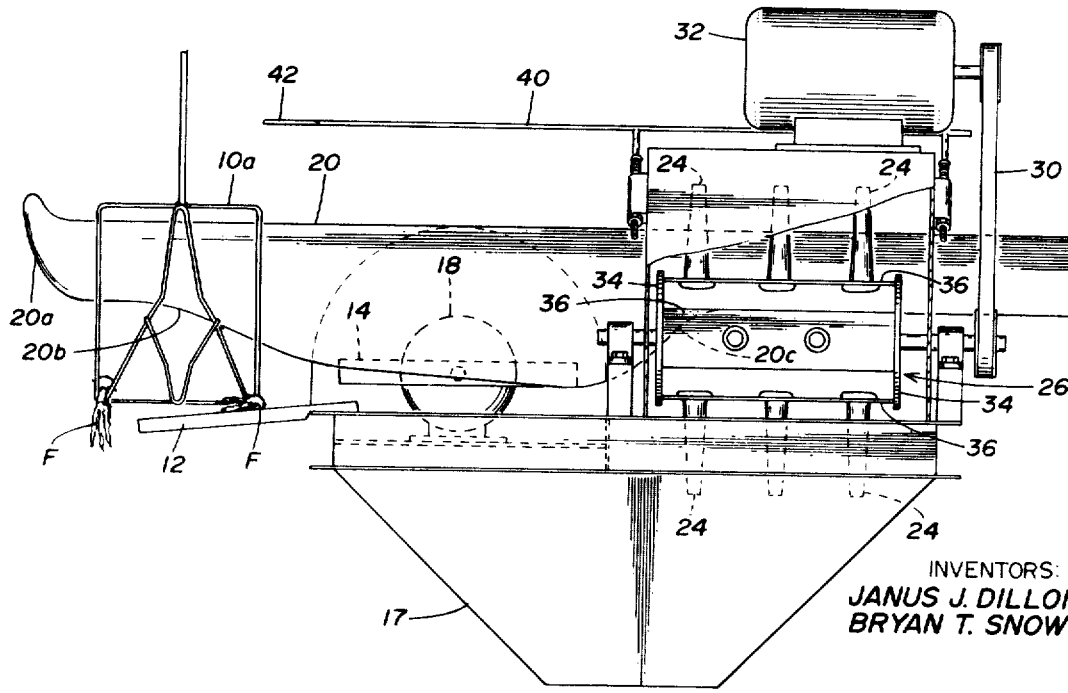
FIG. 2 is a side view of the complete system of the invention.

A pair of fowl feet F depend from opposite sides of each of the moving shackles. As may be clearly seen in FIG. 1, the feet F include knuckle portions K which are generally of such size that the feet are prevented from slipping from the shackles. In accordance with the invention, the feet F are moved upon a guide plate 12 which tends to position the feet F in a generally horizontal position. As shown in FIG. 2, the guide plate 12 inclines slightly upwardly to gradually move the feet F into the desired predetermined position. The feet are moved in the generally horizontal position along the plate until the feet engage with a rotating blade 14. Plate 12 includes a slotted portion 16 through which the edge of the blade 14 passes. The blade 14 is positioned relatively close to the edge of the slot 16 such that a shearing action is produced upon the knuckle portions K of the feet to cleanly sever the knuckle portions. The severed knuckle portions then drop by gravity into a hopper 17, where they may be accumulated for disposal.

Figure 3:
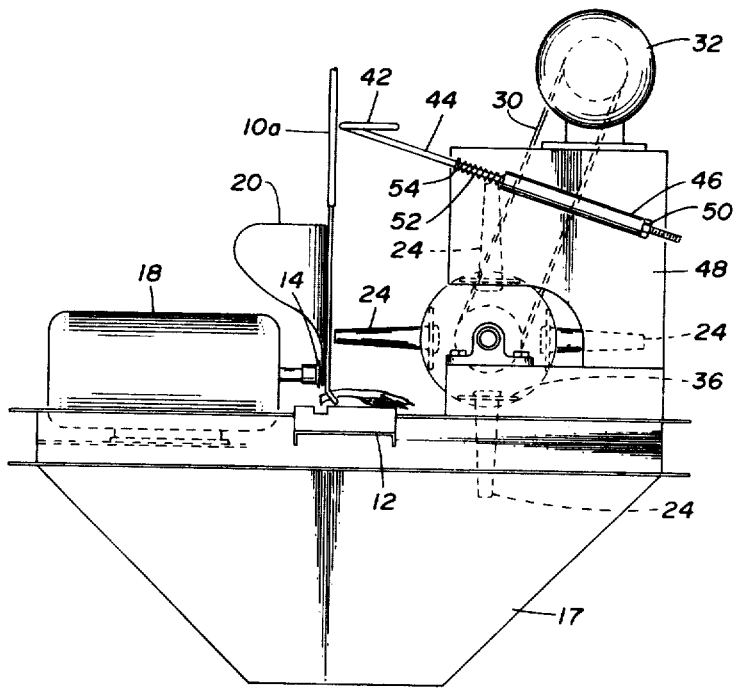
FIG. 3 is an end view of the system shown in FIG. 2.

An electrical motor 18 rotates the blade 14 at a speed sufficient to cleanly sever the knuckle portions of the feet F. As shown in FIGS. 1, 2 and 3, a vertical shield plate 20 is disposed between the rotating blade 14 and the shackles 10. Due to the severing of the knuckle portions K, certain of the feet F will drop into the hopper 17 in the region adjacent the rotating blade 14.

Shield plate 20 includes a front portion 20a which bends away from the shackle path of travel to guide the shackles into the desired position, while preventing the shackles from hanging up on the plate 20. Plate 20 also includes a sloping lower edge portion 20b (FIG. 2) which aids in positioning the feet in the desired horizontal position by forcing the knuckle portion K downwardly at the same time the guide plate 12 is forcing the foot end upwardly.

The shackles 10 are thus forced to move through the present system in a straight line by the plate 20 and by the guide bar 40 to be later described. Because plate 20 is a continuous vertical wall, the shackles are prevented from flopping due to striking by the flexible fingers of the invention. The plate 20 also includes a rear lower edge 20c which slopes upwardly to prevent the fool stubs from hanging up during striking by the flexible fingers.

In order to remove the remaining feet still in the shackles after passage by the blade 14, a plurality of flexible fingers 24 are mounted on a drum 26. Drum 26 is rotatably mounted on a shaft 28 which is rotated by a belt 30 driven by a motor 32. Drum 26 comprises a pair of opposed generally circular ends 34 connected by a plurality of spaced apart slats 36. As shown in FIGS. 1–3, the spaced apart slats 36 enable easy access to the base connection portions of the flexible fingers 24 for maintenance and cleaning thereof. In operation, motor 32 rotates the drum 26 such that the flexible fingers 24 hit the feet remaining on the shackles with a sufficient downward force to propel the feet from the shackles. Due to the fact that the enlarged knuckle portions have been previously severed, the feet may be cleanly knocked from the shackles down into the hopper 17 for disposal thereof. The flexible fingers 24 may comprise any conventional flexible fowl feather removal fingers made of rubber or the like.

Figure 4:
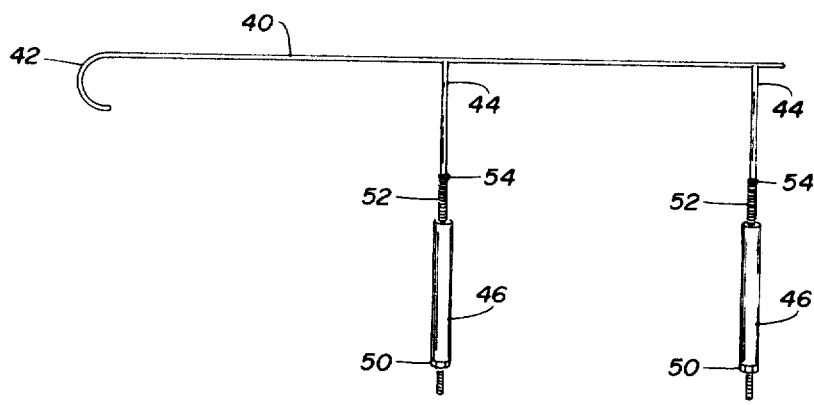
FIG. 4 is a top view of the guide bar of the system.

As shown in FIGS. 2–4, a guide bar 40 is disposed generally parallel to the path of travel of the shackles 10a–d in order to maintain, in conjunction with plate 20, the shackles in the desired position during traverse through the system so that the blade 14 may accurately sever the knuckle portion and such that the flexible fingers 24 may be accurately positioned to remove the feet remaining in the shackles. Guide bar 40 includes a curved end 42, best shown in FIG. 4, to prevent hooking of an askew shackle during entrance into the system. The bar 40 is supported from a pair of perpendicular support bars 44 which extend through sockets 46 mounted on a housing 48. Housing 48 generally surrounds the rotating flexible fingers 24 and supports the motor 32. A nut 50 enables the position of each support bar 44 to be accurately positioned relative to the socket 46. A spring 52 abuts a retainer 54 on each of the bars 46 to enable the bars 44 to move relative to the socket 46 in case a shackle becomes hung against the bar 40 to prevent damage to the shackle system.

It will thus be seen that the present invention provides a system for automatically removing fowl feet depending from moving non-tripping shackles. The severing of the knuckle portion of the feet prevents feet from becoming stuck within the shackles, thus eliminating the necessity for expensive and time consuming manual removal of feet from shackles prior to recycling for additional use. The present system is designed for easy cleaning and maintenance.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for removing the feet of a fowl from a shackle being conveyed along an overhead conveyor comprising:
    means disposed in the path of the conveyor for removing the knuckle portion of the feet, and
    means for striking the portions of the feet remaining on the shackle with sufficient force to propel the feet portions from the shackle.

2. The system of claim 1 wherein said removing means comprises:
    a rotating blade for severing the knuckle portion from each foot, and
    hopper means below said blade for receiving the severed knuckle portions.

3. The system of claim 2 and further comprising:
    a guide plate for positioning the feet relative to said blade and for providing, in conjunction with said blade, a shearing action to the knuckle portions.

4. The system of claim 1 wherein said striking means comprises:
    a plurality of flexible fingers rotatable against the feet portions remaining on the shackle.

5. The system of claim 4 wherein said flexible fingers strike the feet portions with a downward force.

6. A system for removing fowl feet depending from moving shackles comprising:
    a guide surface mounted in the path of the shackles for positioning the feet in a generally horizontal position,
    rotating blade means for shearing knuckle portions from the feet while the feet move in said generally horizontal position,
    hopper structure disposed below said blade means to receive the severed knuckle portions, and
    rotating flexible fingers mounted over said hopper structure for striking the feet to propel the feet from the shackles and into said hopper structure.

7. The system of claim 6 wherein said blade means is rotated in a vertical plane and is mounted adjacent said guide surface to provide a shearing action to the knuckle portions.

8. The system of claim 6 wherein said flexible fingers are mounted for rotation about a generally horizontal axis and wherein said fingers are rotated to strike the feet with a downward motion.

9. The system of claim 6 wherein said blade means and said fingers are mounted on opposite sides of the moving shackles.

10. The system of claim 6 and further comprising: shield means for said blade means and said fingers.

11. The system of claim 6 and further comprising:
    guide means disposed along the travel path of the shackles for maintaining the shackles in a predetermined position, spring means connected to a portion of said guide means for enabling movement of said guide bar if sufficient force is exerted by the shackles.

* * * * *